(12) United States Patent
De Smet et al.

(10) Patent No.: US 9,400,638 B2
(45) Date of Patent: Jul. 26, 2016

(54) REACTIVE EXPRESSION GENERATION AND OPTIMIZATION

(75) Inventors: Bart De Smet, Bellevue, WA (US); Henricus Johannes Maria Meijer, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 46 days.

(21) Appl. No.: 13/291,475

(22) Filed: Nov. 8, 2011

(65) Prior Publication Data

US 2013/0117736 A1 May 9, 2013

(51) Int. Cl.
G06F 9/45 (2006.01)
G06F 9/44 (2006.01)
G06F 17/24 (2006.01)
G06F 9/455 (2006.01)

(52) U.S. Cl.
CPC .. G06F 8/30 (2013.01); G06F 8/40 (2013.01); G06F 9/45516 (2013.01); G06F 17/246 (2013.01)

(58) Field of Classification Search
USPC ........................................................ 717/153
See application file for complete search history.

(56) References Cited

U.S. PATENT DOCUMENTS

| | | | |
|---|---|---|---|
| 7,010,784 B1 * | 3/2006 | Sentovich et al. ............. | 717/140 |
| 7,260,569 B1 * | 8/2007 | Stegelmann et al. ......... | 707/781 |
| 7,421,702 B1 * | 9/2008 | Margulis et al. .............. | 719/316 |
| 7,421,716 B1 * | 9/2008 | Margulis et al. .............. | 719/331 |
| 7,584,462 B2 * | 9/2009 | Wolff et al. .................... | 717/154 |
| 7,774,376 B1 * | 8/2010 | Meijer et al. .................. | 707/802 |
| 7,873,948 B2 | 1/2011 | Sentovich et al. | |
| 7,912,863 B1 * | 3/2011 | Meijer et al. .................. | 707/793 |
| 8,060,868 B2 * | 11/2011 | Meijer ....................... | G06F 8/72 717/114 |
| 2005/0114871 A1 * | 5/2005 | Wolff et al. .................... | 719/331 |
| 2006/0225054 A1 * | 10/2006 | Sentovich et al. ............. | 717/140 |
| 2009/0048995 A1 | 2/2009 | Mahajan et al. | |
| 2010/0088661 A1 * | 4/2010 | Langworthy et al. ......... | 717/100 |
| 2010/0088679 A1 * | 4/2010 | Langworthy et al. ......... | 717/126 |
| 2010/0131556 A1 | 5/2010 | Meijer et al. | |
| 2010/0131936 A1 * | 5/2010 | Cheriton ............... | G06F 9/4438 717/146 |
| 2010/0192129 A1 * | 7/2010 | Langworthy et al. ......... | 717/126 |
| 2012/0047495 A1 | 2/2012 | Meijer et al. | |
| 2012/0084749 A1 | 4/2012 | Gogh et al. | |
| 2012/0260238 A1 * | 10/2012 | Cheriton ............... | G06F 9/4438 717/146 |
| 2013/0117736 A1 * | 5/2013 | De Smet et al. .............. | 717/153 |

FOREIGN PATENT DOCUMENTS

CN 101409649 A 4/2009

OTHER PUBLICATIONS

Sculthorpe et al. "Optimisation of Dynamic, Hybrid Signal Function Networks" Trends in Functional Programming, 2008—red.cs.nott.ac.uk., pp. 16.*

(Continued)

*Primary Examiner* — Marina Lee

(74) *Attorney, Agent, or Firm* — Nicholas Chen; Kate Drakos; Micky Minhas

(57) ABSTRACT

Reactive programming is facilitated. Reactive expressions can be generated automatically from non-reactive expressions or in other words standard expressions. Additionally or alternatively, reactive expressions can be optimized in a number of different ways to minimize computational work.

20 Claims, 10 Drawing Sheets

(56) References Cited

OTHER PUBLICATIONS

Henrik Nilsson, "Dynamic Optimization for Functional Reactive Programming using Generalized Algebraic Data Types", ICFP, 2005—pdf.aminer.org. total pp. 12.*

Burchett et al., "Lowering: A Static Optimization Technique for Transparent Functional Reactivity", Proceedings of the 2007 ACM, total pp. 10.*

Schmidt et al. "Patterns and Performance of Distributed Real-time and Embedded Publisher/Subscriber Architectures" retrieved from <http://www.cs.wustl.edu/~schmidt/PDF/JSS.pdf>, 2003, total pp. 17.*

Nilsson, "Dynamic Optimization for Functional Reactive Programming using Generalized Algebraic Data Types", CiteSeer 2005, total pp. 12.*

Maier et al. "Deprecating the Observer Pattern", Apr. 1, 2010—infoscience.epfl.ch, total pp. 18.*

Smet's, Bart De, "More LINQ with System.Interactive—Functional fun and taming side-effects", Retrieved at <<http://community.bartdesmet.net/blogs/bart/archive/2010/01/07/more-linq-with-system-interactive-functional-fun-and-taming-side-effects.aspx>>, Jan. 7, 2010, pp. 19.

Smet's, Bart De, "Taming Your Sequence's Side-Effects Through IEnumerable.Let", Retrieved at <<http://bartdesmet.net/blogs/bart/archive/2009/09/12/taming-your-sequence-s-side-effects-through-ienumerable-let.aspx>>, Sep. 12, 2009, pp. 29.

Krishnaswami, et al., "Ultrametric Semantics of Reactive Programs", Retrieved at <<http://research.microsoft.com/en-us/um/people/nick/frpultra11.pdf>>, Proceedings of the Twenty-Sixth Annual IEEE Symposium on Logic in Computer Science (LICS), 2011, pp. 14.

Petricek, et al., "Joinads: A Retargetable Control-Flow Construct for Reactive, Parallel and Concurrent Programming", Retrieved at <<http://tomasp.net/academic/joinads/joinads.pdf>>, Proceedings of the 13th international conference on Practical aspects of declarative languages (PADL), Springer, 2011, pp. 16.

Burchett, et al., "Lowering: A Static Optimization Technique for Transparent Functional Reactivity", Retrieved at <<http://www.cs.brown.edu/~sk/Publications/Papers/Published/bck-lowering-opt-trans-frp/paper.pdf>>, Proceedings of the ACM SIGPLAN symposium on Partial evaluation and semantics-based program manipulation, 2007, pp. 71-80.

Mottola, Angelo, "Design and implementation of a declarative programming language in a reactive environment", Retrieved at <<http://www.ecplusplus.com/files/Thesis.pdf>>, 2004-2005, pp. 173.

"International Search Report", Mail Date: Mar. 29, 2013, Application No. PCT/US2012/063633, Filed date: Nov. 6, 2012, pp. 10.

"Supplementary Search Report Issued in European Patent Application No. 12847100.0", Mailed Date: May 28, 2015, 8 Pages.

"First Office Action and Search Report Issued in Chinese Patent Application No. 201210442015.4", Mailed Date: Jan. 23, 2015, 12 Pages.

"Deprecating the Observer Pattern", In EPFL-REPORT-148043., Apr. 1, 2010, 18 Pages.

* cited by examiner

REACTIVE EXPRESSION GENERATION AND OPTIMIZATION

BACKGROUND

Computer programs are often specified with one or more expressions, for instance as a component of a statement. An expression is a combination of values, constants, variables, operators, and a function that is interpreted in accordance with rules of precedence of a particular programming language. An expression can be computed, or in other words evaluated, the result of which is a value of some type (e.g., integer, string, Boolean . . .). By way of example, an arithmetic and programming expression can be "1+2" which can evaluate to "3." Similarly, an expression can correspond to "x+2," wherein "x" is a pointer to a value in memory. Further, "5>4" is an example of a relational, or Boolean, expression that evaluates to true. Evaluated expressions can have side effects meaning that in addition to returning a value there is a secondary, typically undesirable, effect such as a change in some state.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to facilitating reactive programming. In accordance with one aspect of the disclosure, a reactive expression can be generated automatically based on a non-reactive, or standard, expression. In accordance with another aspect, a reactive expression, whether generated from a non-reactive expression or not, can be optimized by applying one or more of a myriad of optimization techniques, for example to avoid duplicating side effects and eliminate excessive reevaluation, and improve performance overall.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Details below are generally directed toward facilitating reactive programming or more particularly reactive expression generation and optimization. Building reactive programs that propagate input updates (a.k.a. reactive programming) requires quite a bit of plumbing code, or, in other words, behind-the-scenes low-level code. Often a programmer's intent gets lost in the process of defining a reactive expression. To address this issue, a mechanism is provided to generate a reactive expression from non-reactive expression. Stated differently, a standard expression can be lifted to a reactive expression. Consequently, a programmer can specify a standard expression (e.g., function) that can subsequently be utilized to produce a reactive expression automatically. Moreover, a reactive expression can be optimized to in many different ways to minimize computational work associated with propagating updates upon changes to inputs, among other things. By way of example and not limitation, reactive expressions can be generated that avoid duplicate side effects, eliminate excessive reevaluation, and improve performance overall (e.g., executes faster, more efficiently . . . ).

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
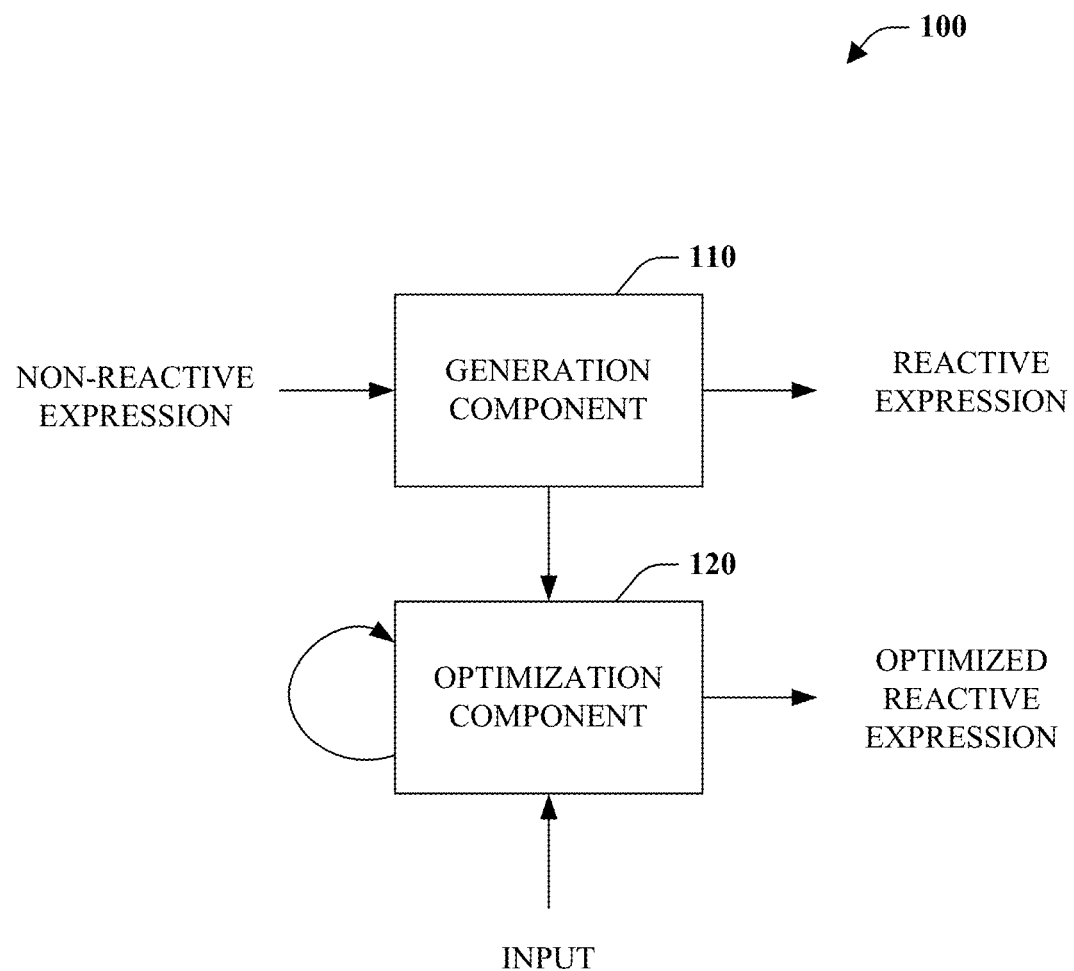
FIG. 1 is a block diagram of a reactive programming system.

Referring initially to FIG. 1, a reactive programming system 100 is illustrated. The system 100 includes a generation component 110 configured to generate a reactive expression based on a non-reactive, or in other words standard, expression. A non-reactive expression such as a function changes solely in response to evaluation. Conversely, a reactive expression changes in response to changes in input. By way of example, consider the expression "a=b+c," meaning "a" is assigned the result of the sum of "a" and "b." If this is a standard, or non-reactive, expression, "a" is assigned the result of "b+c" the instant the expression is evaluated. Subsequently, if "b" or "c" change, the change will have no effect on the value of "a." If the expression is a reactive expression, the value of "a" would automatically be updated based on new values of either or both of "b" and "c." Conventionally, specifying a reactive expression requires quite bit of behind-the-scenes, low-level, boilerplate code. As a result, a programmer's intent is lost in the process of defining reactive functionality. The generation component 110 enables a programmer to simply specify a standard, non-reactive expression and subsequently have an equivalent reactive expression, or reactive version thereof, generated automatically. Further, the generation component 110 can be applied to legacy programs, and more specifically expressions therein, to produce reactive versions.

The generation of reactive expressions by the generation component 110 can occur in several different ways, all of which are within the scope of the appended claims. In one instance, program code can be added to a non-reactive expression to generate a reactive expression. Additionally or alternatively, a non-reactive expression can be converted or otherwise transformed or translated from a non-reactive expression to a reactive expression. Still further yet, a new reactive expression can be produced as a function of a non-reactive expression.

Generation of a reactive expression from a non-reactive expression can be embodied within a "Lift" function in accordance with one aspect. Consequently, generation of a reactive expression can be termed lifting of a non-reactive expression to a reactive expression, or simply lifting or various forms thereof herein. By way of example, a set of operators can be built that have the following signature:

$$\text{Lift} :: (T_1 \times \ldots \times T_n \to R) \to (IO<T_1> \times \ldots \times IO<T_n> \to IO<R>)$$

In other words, operators can take a standard expression, such as a function, over arguments of types "$T_1$" through "$T_n$" (where "n" is an integer greater than or equal to zero) and with a return type "R." As a result, the operators produce a lifted expression that accepts "IO<T>" variants of the arguments and returns "IO<R>" variant of the result type, where "IO<T>" and "IO<R>" refer to "IObservable<T>" and "IObservable<R>" an interface (e.g., provider) that represents a class that sends push-based notifications of type "T" or "R" to an observer in accordance with an observer design pattern.

One possible approach to implement the desired lifting behavior is to construct an observable sequence (e.g., push-based data source) out of input sequences using a "Combine-Latest" operator (e.g., merges two observable sequences into one sequence whenever one of the observable sequences has a new value) and supplying a function as an argument. For example:

```
Func<IObservable<T1>, IObservable<T2>, IObservable<R>> Lift<T1, T2,
R>(Func<T1, T2, R> f)
{
    return (o1, o2) => o1.CombineLatest(o2, f);
}
```

For functions of higher arity, or, in other words, greater number of arguments than two, "CombineLatest" operators with higher arity could be supplied to make the lifting process as straightforward, as shown above. Alternatively, intermediate combiner functions could be used. For instance:

```
Func<IObservable<T1>, IObservable<T2>, IObservable<T3>, IObservable<R>>
Lift<T1, T2, T3, R> (Func<T1, T2, T3, R> f)
{
    return (o1, o2, o3) => o1.CombineLatest(o2, (a, b) =>
        new { a, b }) .CombineLatest(o3, (ab, c) => f(ab.a, ab.b, c));
}
```

The above allocates many intermediate objects, so higher arity "CombineLatest" overloads may be preferred. That being said, for functions of arbitrary number of arguments, it is likely regardless of the number of "CombineLatest" overloads, the technique above may still play a role (e.g., lifter is presented for arbitrary functions, using expression trees). Further, instead of using anonymous types for intermediate projections, built-in tuple types could be used as well. For example:

```
Func<IObservable<T1>, IObservable<T2>, IObservable<T3>, IObservable<R>>
Lift<T1, T2, T3, R>(Func<T1, T2, T3, R> f)
{
    return (o1, o2, o3) => o1.CombineLatest(o2, (a, b) =>
        new Tuple<T1, T2>(a, b)).CombineLatest(o3, (t, c) => f(t.Item1,
        t.Item2, c));
}
```

One example where reactive-type expressions are utilized is in spreadsheet programs. For example, spreadsheet cells can include literal values or formulas such as "B1+C1" that are evaluated based on values of other cells. Whenever a value of a dependent cell changes, the value resulting from the formula will be updated. However, conventionally these type of reactive expressions are tightly coupled to the notion of cells as well as their internal representation and as such cannot operate over arbitrary reactive (e.g., push-based) data sources. As used herein, a reactive expression refers to expressions that are continuously evaluated over time wherein reevaluation is triggered upon alterations to one or more of an expression's sub-expressions or dependencies, which can themselves be reactive expressions. Moreover, reactive expressions as referred to herein are intended to be more general than similar spreadsheet expressions and operate over any reactive/observable data source.

Figure 2:
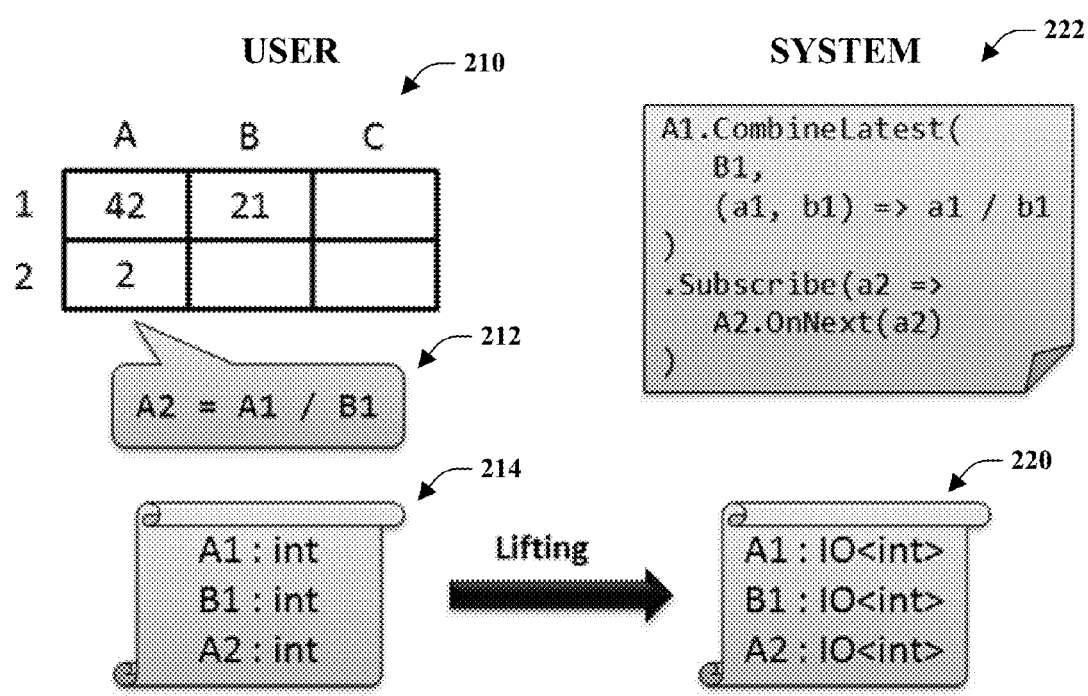
FIG. 2 illustrates implementation of a spreadsheet model utilizing disclosed aspects.

FIG. 2 illustrates implementation of a spreadsheet model utilizing disclosed aspects to facilitate clarity and understanding. A simple spreadsheet 210 is illustrated with six total cells. Cells "A1" and "B1" include literal values, namely "42" and "21." Cell "A2" includes expression 212 which indicates "A2=A1/B1." Cells are identified at 214 as standard integers. After a lift operation is performed, the same cells are transformed into observables of type integer. Code 222 is generated to transform the non-reactive expression 212 into a reactive expression.

Turning attention back to FIG. 1, the reactive programming system 100 can also include an optimization component 120. The generation component 110 can be basic in nature with respect to generation of a reactive expression. The optimization component 120 can enable a more sophisticated approach to reactive expression generation. More specifically, the optimization component 120 can be configured to acquire a reactive expression and generate an optimized reactive expression, or, in other words, an optimized version of a reactive expression. Various optimization techniques can be employed to minimize the amount of computational work required to propagate updates to one or more inputs and generate a new output, among other things. Code can be added, deleted, or altered with respect to code that enables a reactive behavior. Optimizations can be performed at compile time or dynamically at runtime utilizing a compiler or other system. Further, optimizations can be governed by various inputs including user specified policies or other data. Further yet, a feedback loop can be employed to optimize a reactive expression continuously given past performance information or current context information, for example. Additionally, it should be appreciated that the optimization component 120 can be employed outside the context of generation of a reactive expression from a non-reactive expression, for instance, where a reactive expression already exists (e.g., manually coded, generated with a different system . . . ).

Figure 3:
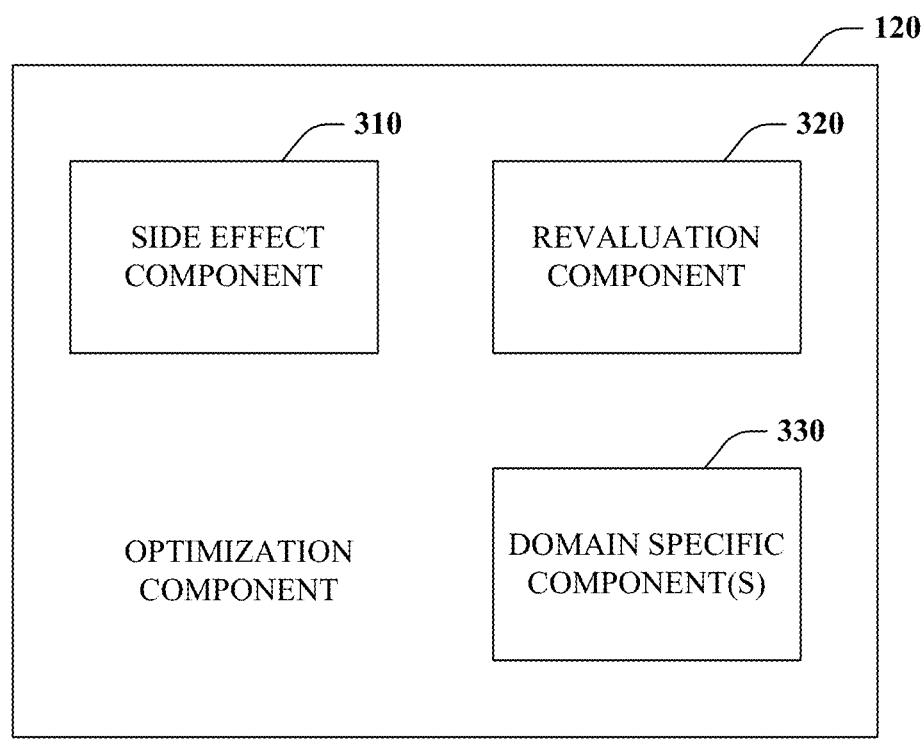
FIG. 3 is a block diagram of a representative optimization component.

FIG. 3 depicts a representative optimization component 120 in further detail. The optimization component 120 includes side effect component 310, which can be configured to avoid at least duplicate (e.g., two or more) side effects. Expressions can have side effects duplicates of which are undesirable. For instance, if an expression causes a credit card to be charged it is desirable to not perform the action more than a required number of times (e.g., once). More specifically, if a function is supplied with the same observable source for multiple arguments, use of a "CombineLatest" operator will result in multiple subscriptions. This in turn causes duplicate side effects. By way of example, if an expression includes "A1+A1," this can cause duplicate subscriptions to the same observable source resulting in potentially duplicate side effects. By detecting duplicate input sequences and coalescing their subscriptions, duplicate side effects can be avoided. Of course, other approaches can be employed including leaving the responsibility of avoiding at least duplicate side effects to a caller or performing in some desired manner configurable with a policy flag.

Figure 4:
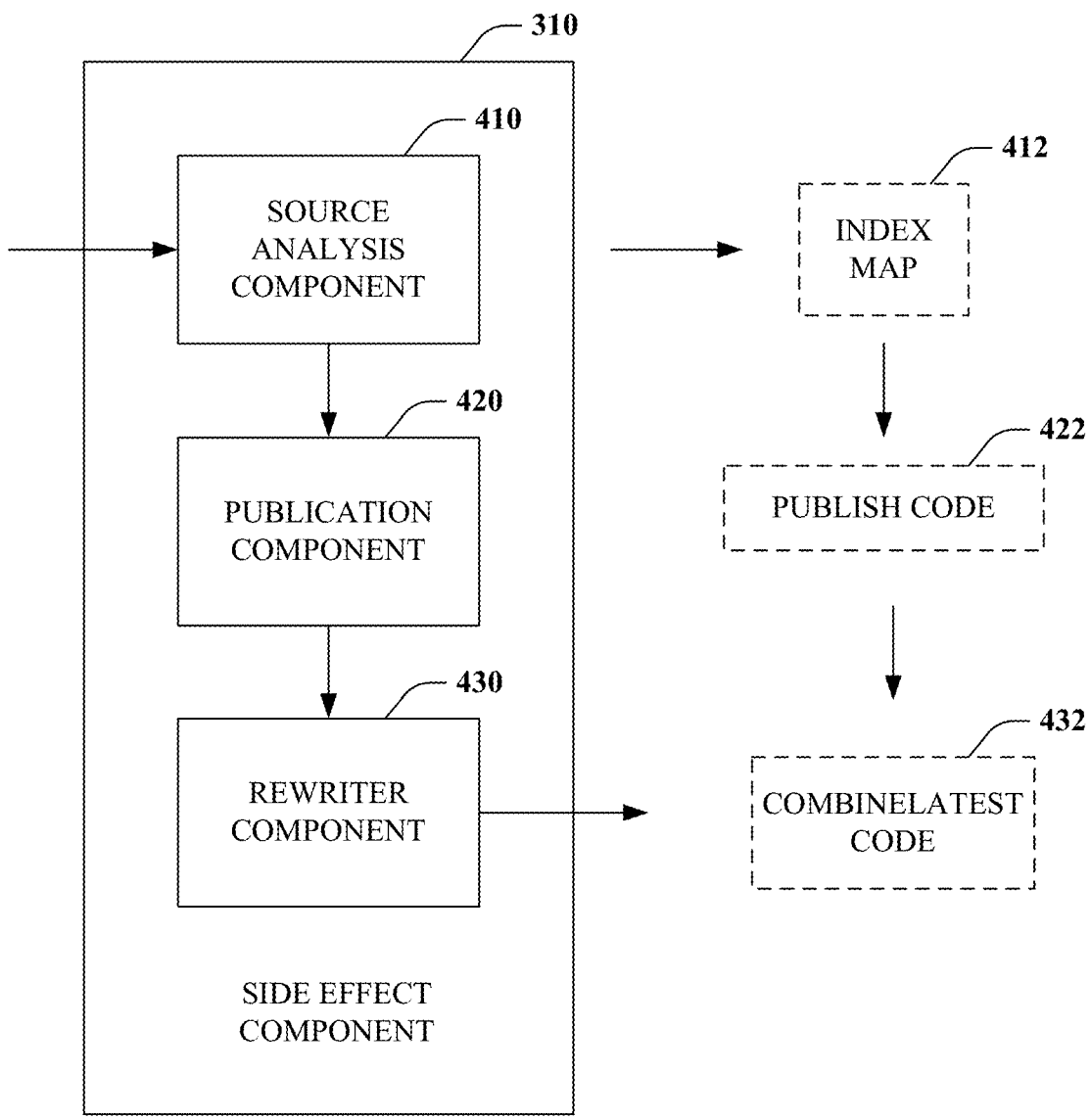
FIG. 4 is a block diagram of a representative side effect component.

FIG. 4 illustrates a representative side effect component 310 in further detail including source analysis component 410, publication component 420, and rewriter component 430. The source analysis component 410 can be configured to analyze input observable sequences and filter out duplicates, or, in other words, identify unique sequences, as a function of object identity checks. For example, consider a standard expression "a*b+c." Here, it can be determined, for example at run time, that "a" and "c" correspond to, or derive from, the same input sequence or source. As a result, an index map 412 or similar structure can be generated by the source analysis component 410 indicating that "a" and "b" are unique and "a" and "c" correspond to the same input sequence or source.

Note that the source analysis component 410 can be configured to utilize other mechanisms beyond object identity to filter out duplicates or identify unique sequences or sources. For instance, if some input sequences represent expressions with the same meaning this could be detected using an advanced comparer or equality function. Consider, for example, the query expression "from x in xs where x % 2==0 select x" appearing multiple times (e.g., recursively) for the same "xs" source. More generally, the source analysis component 410 can be configured to perform more intelligently tracing common sub-query expressions from roots (e.g., query sources) down. For instance, consider two query expressions "from x in xs where x % 2==0 select x" and "from x in xs where x % 2==0 select x+1." Those are the same expressions except for the projection parts, "select x" versus "select x+1." Accordingly, the remainder, "from x in xs where x % 2==0," can be reused. Generally, the source analysis component 410 can be configured to delineate shareable computation. Stated differently, the source analysis component 410 can be configured to detect common sub-expressions The publication component 420 can be configured to alias unique sources as determined by the source analysis component 410 for multiple use by employing a "Publish" operator, for example:

---

IObservable<R> Publish<T, R> (IObservable<T> source, Func<IObservable<T>, IObservable<R>> f);

---

Since multiple distinct sources can occur, "Publish" operators with higher arity can be introduced to simplify publication of many sources simultaneously (e.g., using T1, T2 . . . Tn for generic parameters for sources and the function parameter). Regardless of how many sources are utilized by an expression, the result can be that a single subscription to such sources is established.

The source analysis component 410 and the publication component 420 can exchange information about shared sources as well as how the shared sources are used. For instance, sources can be tagged with their parameter position. This index matches the parameter position in a reactive expression. For example, "Lift((a, b, c,)=>a*b+c) (xs, ys, xs)" results in two distinct sources "xs" and "ys." The first source "xs" can have indices "0" and "2," and the second source "ys" can have index "1." Unique sources can be published resulting in an alias within a publication function (e.g., publish code 422) where they can be used multiple times as described earlier. In the running example, this results in the following skeleton: "Observable.Publish(xs, ys, (xs_, ys_)=>. . . ." The body of the publication function can be supplied with a lifted computation. Its input includes the map of function parameter indices on to the (aliased) sources represented in an index map 412. In the running example, "0" maps to "xs_," "1" maps to "ys_," and "2" maps to "xs_." In other words, the parameters "a," "b," and "c" are drawn from "xs_," "ys_," and "xs_," respectively. Notice the side effect component 310 can be smart about redundant publications. For instance, above, the "ys" source is published even though it is only used once.

An optimization can be to eliminate this redundant step. Code can be generated dynamically here based on detected equalities of sources provided to a lift function, for example.

Residual expressions for an extracted common source expressions can be communicated as well. For example, "Lift ((a, b)=>a+b)(xs.Where(x=>x % 2==0, xs.Where(x=>x % 2==0).Select(x=>x+1))" could result in publication of the common sub-expression "xs.Where(x=>x % 2==0)" if "xs" indeed is the same source for both uses. In this case, a parameter index map 412 can include additional information about the residual expression to be applied after publication. In the running example, "xs.Where(x=>x % 2==0)" now acts as a common source with indices "0" and "1." However, for index "0" the residual expression can be set to null, while index "1" carries the residual expression ".Select(x=>x+1). The common source can still be published once, with the aliased source being carried forward, "xs.Publish (xs_=>...)." However, the index map with the residual expressions can be carried along as well. Inside the expression for the publication function, uses of "a" in the lifted function can be drawn from "xs_" (as index 0, corresponding to "a" does not have a residual expression), while uses of "b" can be drawn to "xs_" too, after use of the residual "xs_.Select(x=>x+1)" expression (conform index 1's entry in the map).

The rewriter component 430 can be configured to rewrite an expression into a reactive expression. It can use the index map 412 for parameters to the originating sources, supplied by the source analysis component 410 and/or publication component 420. The rewriter component 430 can be configured to analyze a function's parameters in order, querying the index map 412 for the sources that will provide the values corresponding to the parameter after lifting. After doing this mapping, a chain of "CombineLatest" operator calls can be built and the original function is supplied as the body (e.g., CombineLatest code 433). For example, consider again "Lift ((a, b, c)=>a*b+c)(xs, ys, xs)." The function generated by lift include logic that 1) detected duplicate use of sequence "xs," resulting in an index map: "xs ->0, 2" and "ys->1;" 2) inserted a publish call for at least "xs" as it gets reused: "xs.Publish(xs_=>...); and 3) kept track of the mapping of "xs_->0 (a), 2(c)" and "ys->1(b). The rewriting component 430 can now build up the publish body using "CombineLatest" calls for sources being used. Sources that are only used once can go without a prior "Publish:" "xs_=>xs_.CombineLatest(ys, (x, y)=>...)." Using the index map, the "CombineLatest" combiner function parameters can be mapped onto the supplied function being lifted. In this case, both "a" and "c" map onto "x" and "b" maps onto "y:" "(x, y)=>x*y+x." As will be discussed later, calls to "DistinctUntilChanged" can be interwoven with the expression being created for the "CombineLatest" calls.

Returning to FIG. 3, the optimization component 120 also includes reevaluation component 320 that can be configured to limit the reevaluation, or, in other words, re-computation, of an expression where possible. For example, in one instance reevaluation can be restricted to instances where an input sequence value changes. If an expression is reevaluated upon every change, there can be duplicate values that unnecessary trigger reevaluation. Accordingly, the reevaluation component 320 can be configured to initiate reevaluation of distinct values or in other words values that differ from a previous value. In accordance with one implementation, this can be accomplished by utilizing a "DistinctUntilChanged" operator.

By way of example and not limitation, consider the following piece of code:

```
var f = Lift((a, b, c) => f1(a) * f2(b) + f3(c));
```

Assuming all three inputs to "f" are unique, the rewrite can look as follows:

```
(o1, o2, o3) => o1.CombineLatest (
    o2, (x, y) => f1 (x) * f2 (y)).CombineLatest(o3, (t, z) => t + f3(z))
```

Now a change to "o1" would trigger reevaluation of "f1(x)*2 (y)." However, if that result does not change from the previous computed value of "f f1(x)*f2(y)" (with "x" being the previous element from "o1"), the evaluation triggered by the "CombineLatest(o3, ...)" is redundant. We can cut off the computation at this point by injecting "DistinctUntilChanged" calls:

```
(o1, o2, o3) => o1.CombineLatest(o2, (x, y) => f1 (x) *
    f2(y)) .DistinctUntilChanged ( ) .CombineLatest(o3, (t, z) => t + f3 (z))
```

In fact, this reduction of change propagation can be based on further analysis of the expression of a function. In the sample shown here, "f1(x)" (and any other such function application) is a black box whose outcome may be the same for many values of "x." Even though the source of such values "x" (in the sample, "o1") may signal updates, "f1(x)" may remain stable. For instance, consider a function that multiplies an input value by zero. A rewrite can be used to delineate islands of reevaluation as follows:

```
(o1, o2, o3) => o1.Select (x => f1 (x))
    .DistinctUntilChanged ( ) .CombineLatest (o2.Select (y => f2 (y))
    .DistinctUntilChanged( ), (x _, y_) => x_ * y_) .CombineLatest(o3.Select (z =>
    f3 (z)) .DistinctUntilChanged ( ), (t, z_) => t + z_)
```

In other words, the "DistinctUntilChanged" operation can be positioned close to an input source to identify distinct contiguous elements or higher up with respect to operations over the input. The particular position is configurable and dependent upon properties of a function itself (e.g., number of unique values, distribution of values ...). In operation, a cache can be maintained of a previous element to which a comparison can be made to a subsequent element to determine whether an input element is distinct.

The optimization component 120 can also include one or more domain-specific components 330 that optimize a reactive expression based on specific domains or domain information. Below illustrates use of a hypothetical math-savvy embodiment of a domain-specific component 330. Consider for or example:

```
var f = Lift ((a, b, c) => a * b + c);
```

Here, a programmer has specified that the lambda expression "(a, b, c)=>a*b+c" be lifted or in other words that a reactive version of the lambda expression be generated and the output be assigned to "f." At this point, the expression cannot be optimized and as a result a generic piece of code can be generated that can accept any three observable sequences as input. However, if the inputs corresponding to the lifted parameters "a" and "c" happen to be the same sequence, things can be optimized to:

```
var res = f (xs, ys, xs);
```

As we previously discussed, this can be rewritten into:

```
xs.Publish (xs_ => xs_.CombineLatest (ys, (x, y) => x * y + x));
```

However, now a rewrite of the function can be accomplished to simplify it, as "a" and "c" now contain the same value "x." Now "x" can be factored out as follows:

```
xs.Publish (xs_ => xs_.CombineLatest (ys, (x, y) => (x + 1) * y));
```

Such optimization is domain-specific with respect to types of sequences involved—here, observable sequences of integers.

Figure 5:
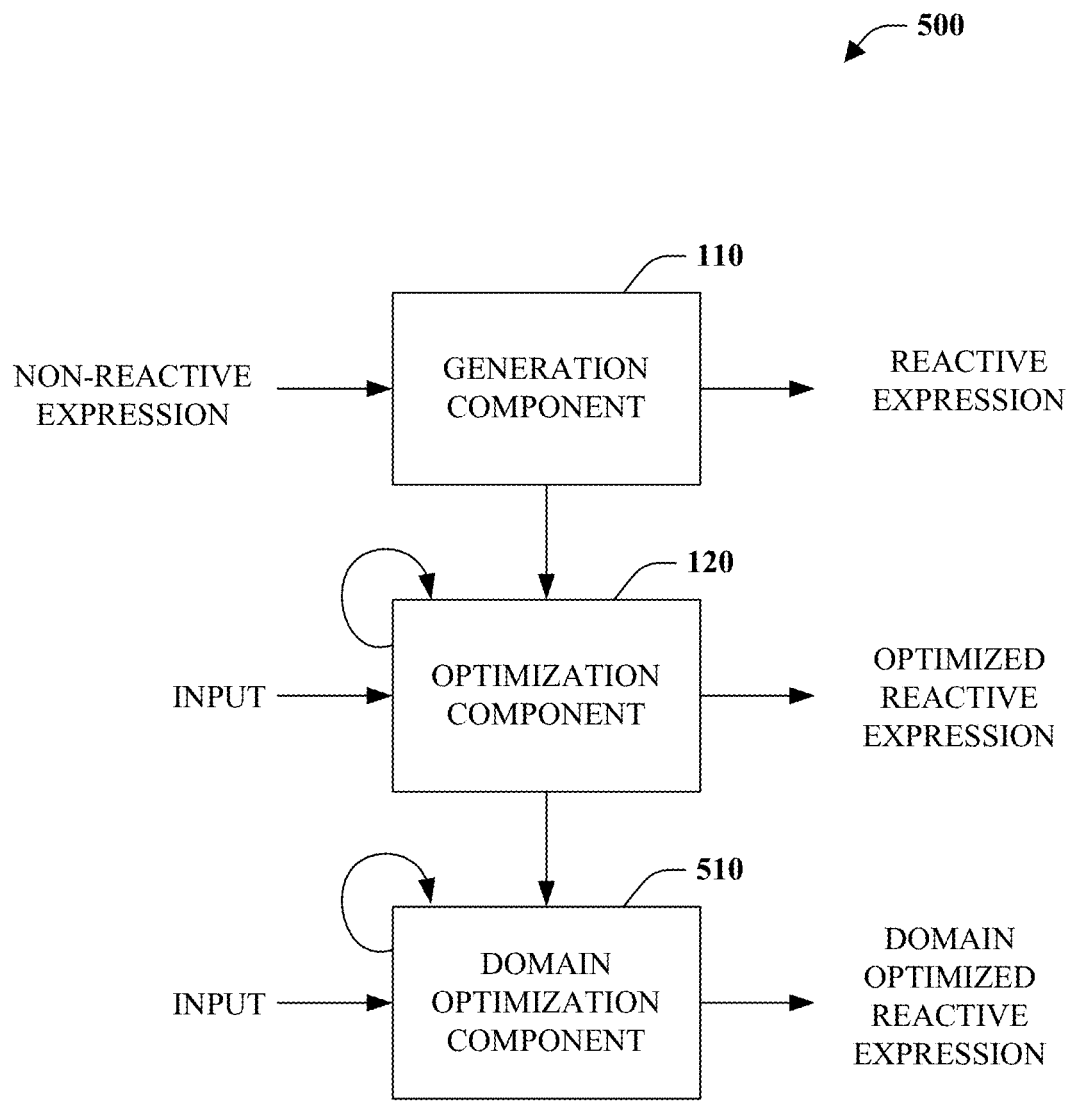
FIG. 5 is a block diagram of a reactive expression system including a domain optimization component.

Additionally or alternatively, specific optimization functionality can be external to the optimization component 120 as shown system 500 of FIG. 5. System 500 includes the generation component 110 and the optimization component 120 previously described. The system 500 further depicts the domain optimization component 510 communicatively coupled with and external to the optimization component 120. Such an external domain optimization component 510 can be discovered from one or more sources based on the type of sequences involved in an expression, for example. The domain optimization component 510 can optionally utilize external information and a feedback loop in in its optimization. The output of the domain optimization component 510 can be a domain optimized reactive expression. Furthermore, although depicted as dependent upon the optimization component 120 this is not required. In fact, the domain optimization component 510 a reactive expression (optimized or not) can be passed through by way of the optimization component 120 or received or retrieved directly.

A variety of other optimization strategies can be applied by way of the optimization component 120. By way of example and not limitation, frequency of change can be utilized as a basis for optimization. A reactive expression can be coded to account for the frequency at which an input source provides elements or in other words the "chattiness" of a source. Where an expression is represented in an expression tree, optimization can correspond to rebalancing the expression, here for frequency of change. Generally, it is desirable to utilize the shortest path for things that change most often. For example, suppose you have three inputs "A," "B," and "C," and "C" changes fast. Accordingly, an optimization would be to perform a "CombineLatest" operation on "A" and "B," and then a "CombineLatest" operation on with "C." Now "C" has the shortest path length. This is analogous to an organizational structure in which the most important person is closest to the top with the least amount of communication delay, or, in other words, the least amount of managers interfering. Further, the frequency at which sources change can vary over time, a reactive expression can be re-optimized in light of the frequency of change of input sequences.

Optimization techniques can be controlled through a user specified policy. By way of example and not limitation, consider utilization of a "DistinctUntilChanged" operator. This operator is expensive in that it needs to maintain state, namely the last element that was provided by a source. If the source does not have adjacent elements that are the same, use of the operator is wasteful. Accordingly, a user can configure when such an operator and thus an optimization is employed. Imagine a global positioning system (GPS) that supplies location information every second and has a resolution of one-hundred feet. If an individual is walking, use of a "DistinctUntilChanged" operator is useful, as it will take some time before new value is received upon journeying one-hundred feet. However, if the same individual is traveling in a car on the highway, use of the operator does not make much sense since it is unlikely that any values will be thrown away. Further, expiration policies can be established as well that invalidate caches housing elements for comparison to determine distinct elements.

Optimization can be performed dynamically based on runtime analysis or statically at compile time upon inspection of an expression supplied by a user. Dynamic optimization can involve analyzing supplied observable sequences or sources and emitting specialized code based on the inputs, for example. Static optimization can involve analyzing a non-reactive expression and eliminating redundant parameters (e.g., (a, b)=>a), sharing computation (e.g., using distributive laws . . . ), for instance. Furthermore, an implementation of a reactive expression can be dynamically readjusted. In this case, a threshold, policy, or cost benefit analysis can be employed to determine if, and when, to readjust the implementation to optimize execution further.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, such mechanisms can be to infer reactive expression optimizations.

In view of the exemplary systems described supra, methodologies that may be implemented in accordance with the disclosed subject matter will be better appreciated with reference to the flow charts of FIGS. 6-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 6:
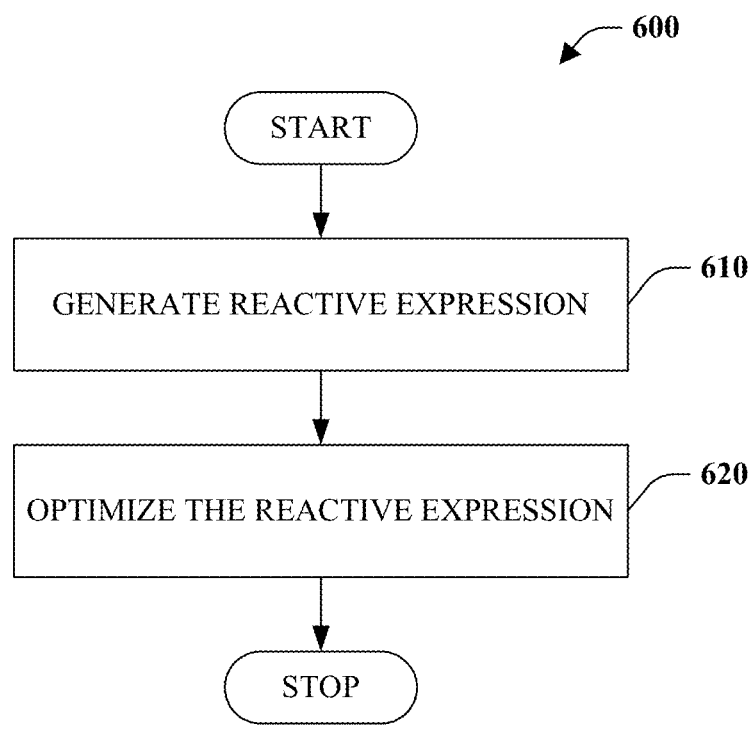
FIG. 6 is a flow chart diagram of a method of facilitating reactive programming.

Referring to FIG. 6, a method of facilitating reactive programming 600 is illustrated. At reference numeral 610, a reactive expression is generated, for example based on a non-reactive, or standard, expression specified by a program. In other words, non-reactive expression can be lifted to a reactive expression. For instance, an observable sequence can be constructed out of input sequences using a "CombineLatest" operator and supply a non-reactive expression, such as a function, as an argument. At reference numeral 620, the reactive expression is optimized. Stated differently, an optimized version of a reactive expression is generated. A myriad of novel or known optimization techniques can be utilized including but not limited to filtering out subscriptions to duplicate input sequences to avoid duplicate side effects or improve performance, and restricts reevaluation of a reactive expression, or change propagation, to instances where an input sequence value changes to limit excess reevaluation.

Figure 7:
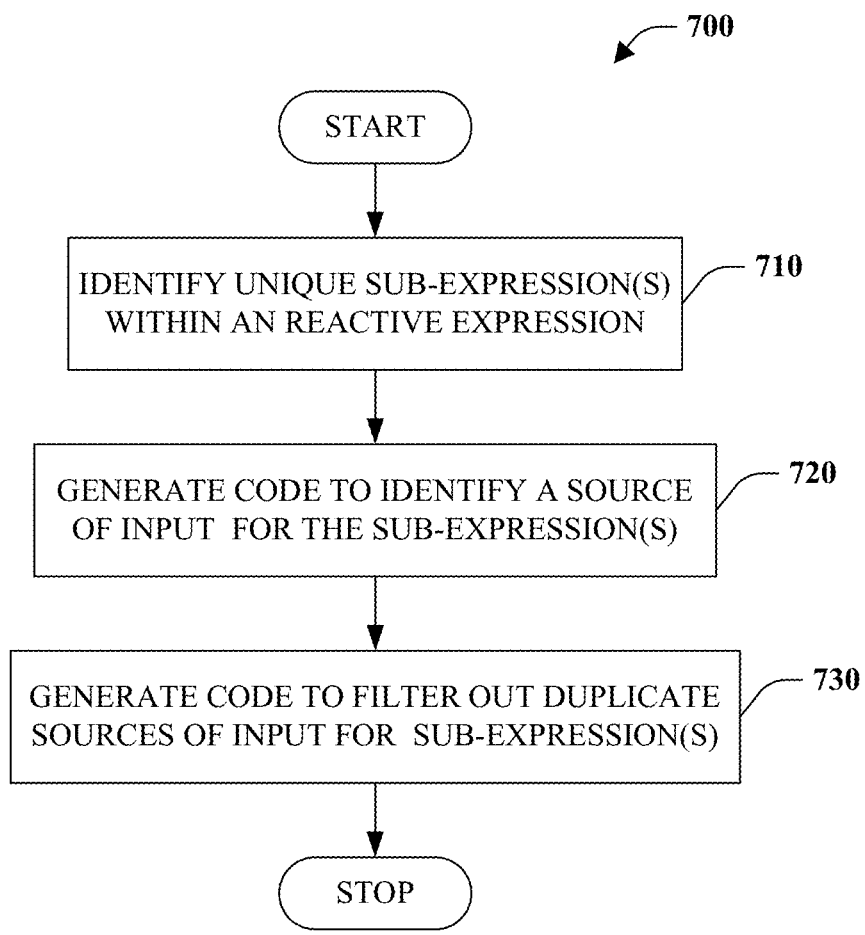
FIG. 7 is a flow chart diagram a method of optimizing a reactive expression.

FIG. 7 depicts a method 700 of optimizing a reactive expression. At reference numeral 710, a unique sub-expression(s) within a reactive expression is identified. Code is generated, at 720, to identify a source of input for the sub-expression, for example based on object identifiers. At reference numeral 730, code can be generated to filter out duplicate sources of input for sub-expressions. As a result, subscriptions to observable sequences, or sources of input, are limited thereby avoiding duplication of side effects and improving performance.

Figure 8:
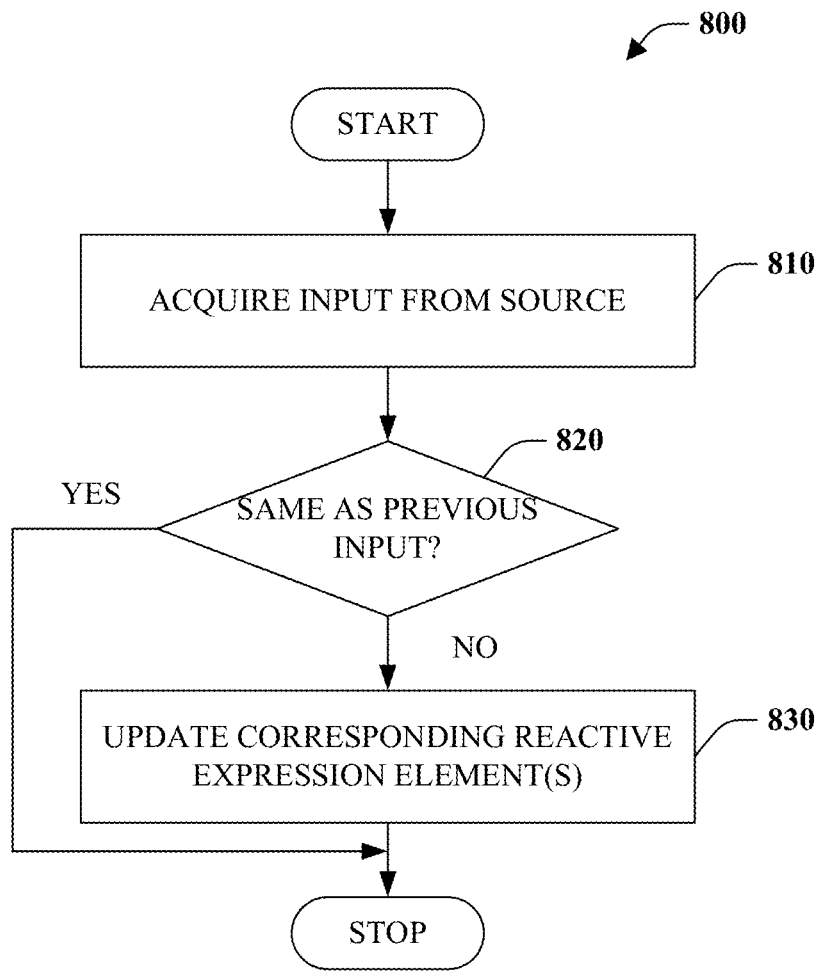
FIG. 8 is a flow chart diagram of a method of optimizing a reactive expression.

FIG. 8 illustrates a flow chart diagram of a method 800 of optimizing a reactive expression. At numeral 810, input is acquired from a source. For example, an observable sequence can push values to observer in accordance with a subscription to the observable sequence. At reference numeral 820, a determination is made as to whether the input is the same as the previous, or last provided, input. For example, cache can be maintained including the last provided value for comparison purposes. If, at 820, the input is the same ("YES"), the method terminates and in effect discards the input. Alternatively, if the input is not the same but rather is distinct from a contiguous value ("NO"), one or more elements associated with the source can be updated at reference 830.

Figure 9:
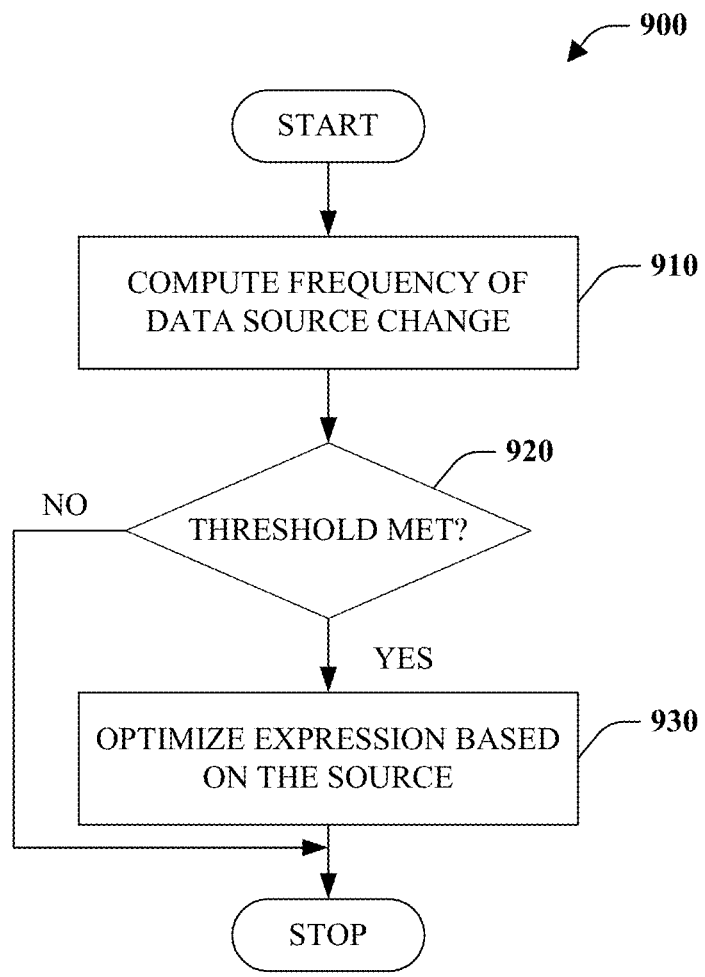
FIG. 9 is a flow chart diagram of a method of optimizing a reactive expression.

FIG. 9 depicts a method 900 of optimizing a reactive expression. At reference numeral 910, a frequency of data source change is computed. In other words, the chattiness of an input source is determined At numeral 920, a determination is made as to whether a threshold has been met as specified with respect to a policy for example. Stated differently, the determination concerns whether it is prudent to modify an implementation of a reactive expression for example based a specific frequency or change in frequency, or on a cost/benefit analysis with the cost being that associated with making a change and the benefit being the effect of an implementation alteration. If a threshold has not been met ("NO"), the method can simply terminate. However, if at 920 it is determined that a threshold has been met ("YES"), the method proceeds at numeral 930 where a reactive expression is optimized based on the frequency of data source change. For example, source associated with the greatest frequency of change can be positioned with the shortest path length.

As used herein, the terms "component" and "system" as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner It is to be appreciated a myriad of additional or alternate examples of varying scope could have been presented, but have been omitted for purposes of brevity.

The conjunction "or" as used this description and appended claims in is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'A' and 'B,'" then "'A' employs 'X' or 'Y'" is satisfied under any of the foregoing instances.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 10:
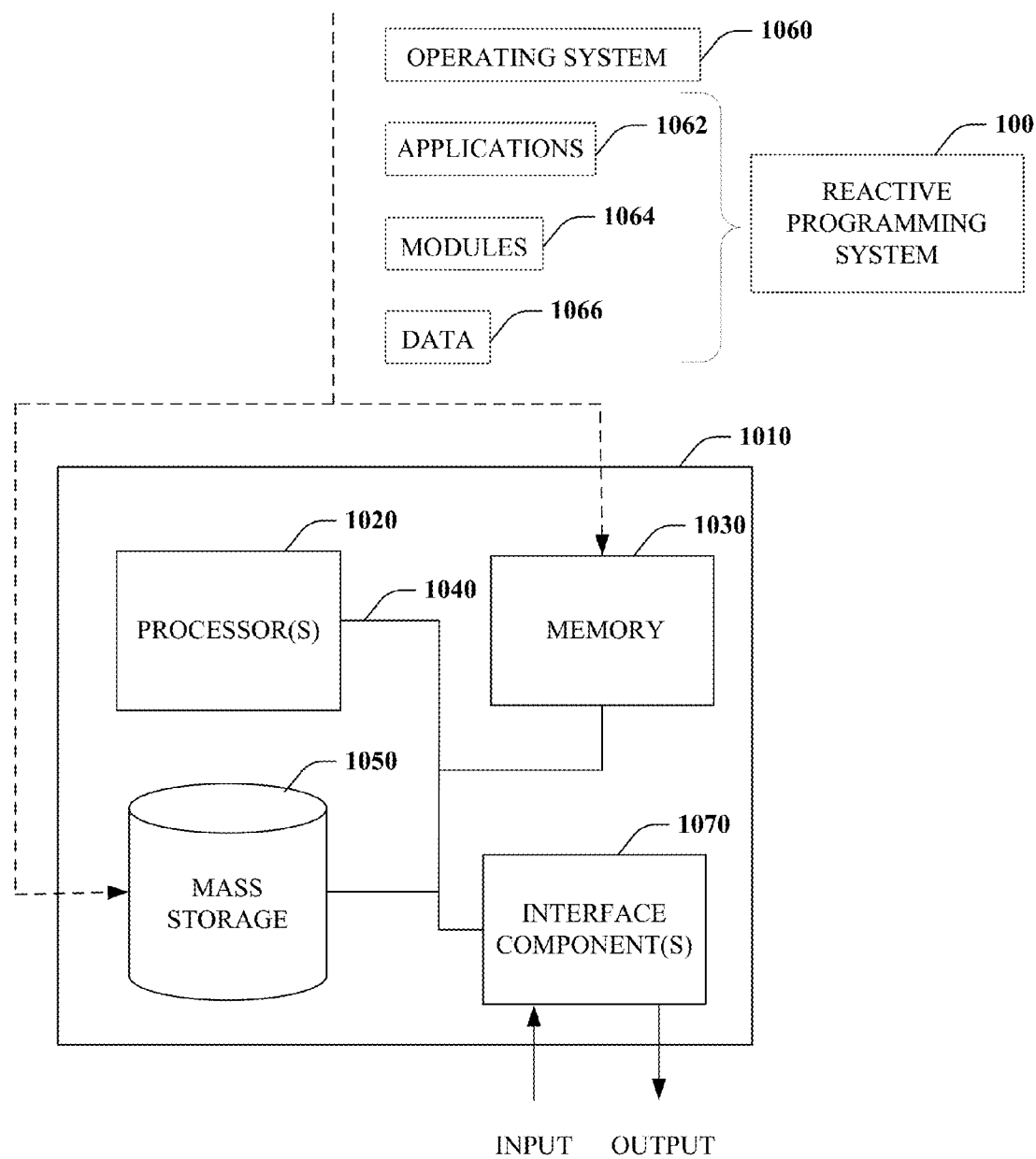
FIG. 10 is a schematic block diagram illustrating a suitable operating environment for aspects of the subject disclosure.

In order to provide a context for the claimed subject matter, FIG. 10 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 10, illustrated is an example general-purpose computer 1010 or computing device (e.g., desktop, laptop, server, hand-held, programmable consumer or industrial electronics, set-top box, game system . . . ). The computer 1010 includes one or more processor(s) 1020, memory 1030, system bus 1040, mass storage 1050, and one or more interface components 1070. The system bus 1040 communicatively couples at least the above system components. However, it is to be appreciated that in its simplest form the computer 1010 can include one or more processors 1020 coupled to memory 1030 that execute various computer executable actions, instructions, and or components stored in memory 1030.

The processor(s) 1020 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1020 may also be implemented as a combination of computing devices, for example a combination of a DSP and a microprocessor, a plurality of microprocessors, multi-core processors, one or more microprocessors in conjunction with a DSP core, or any other such configuration.

The computer 1010 can include or otherwise interact with a variety of computer-readable media to facilitate control of the computer 1010 to implement one or more aspects of the claimed subject matter. The computer-readable media can be any available media that can be accessed by the computer 1010 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 1010.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1030 and mass storage 1050 are examples of computer-readable storage media. Depending on the exact configuration and type of computing device, memory 1030 may be volatile (e.g., RAM), non-volatile (e.g., ROM, flash memory . . . ) or some combination of the two. By way of example, the basic input/output system (BIOS), including basic routines to transfer information between elements within the computer 1010, such as during start-up, can be stored in nonvolatile memory, while volatile memory can act as external cache memory to facilitate processing by the processor(s) 1020, among other things.

Mass storage 1050 includes removable/non-removable, volatile/non-volatile computer storage media for storage of large amounts of data relative to the memory 1030. For example, mass storage 1050 includes, but is not limited to, one or more devices such as a magnetic or optical disk drive, floppy disk drive, flash memory, solid-state drive, or memory stick.

Memory 1030 and mass storage 1050 can include, or have stored therein, operating system 1060, one or more applications 1062, one or more program modules 1064, and data 1066. The operating system 1060 acts to control and allocate resources of the computer 1010. Applications 1062 include one or both of system and application software and can exploit management of resources by the operating system 1060 through program modules 1064 and data 1066 stored in memory 1030 and/or mass storage 1050 to perform one or more actions. Accordingly, applications 1062 can turn a general-purpose computer 1010 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the reactive programming system 100, or portions thereof, can be, or form part, of an application 1062, and include one or more modules 1064 and data 1066 stored in memory and/or mass storage 1050 whose functionality can be realized when executed by one or more processor(s) 1020.

In accordance with one particular embodiment, the processor(s) 1020 can correspond to a system on a chip (SOC) or like architecture including, or in other words integrating, both hardware and software on a single integrated circuit substrate. Here, the processor(s) 1020 can include one or more processors as well as memory at least similar to processor(s) 1020 and memory 1030, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the reactive programming system 100 and/or associated functionality can be embedded within hardware in a SOC architecture.

The computer 1010 also includes one or more interface components 1070 that are communicatively coupled to the system bus 1040 and facilitate interaction with the computer 1010. By way of example, the interface component 1070 can be a port (e.g., serial, parallel, PCMCIA, USB, Fire Wire . . . ) or an interface card (e.g., sound, video . . . ) or the like. In one example implementation, the interface component 1070 can be embodied as a user input/output interface to enable a user to enter commands and information into the computer 1010 through one or more input devices (e.g., pointing device such as a mouse, trackball, stylus, touch pad, keyboard, microphone, joystick, game pad, satellite dish, scanner, camera, other computer . . . ). In another example implementation, the interface component 1070 can be embodied as an output peripheral interface to supply output to displays (e.g., CRT, LCD, plasma . . . ), speakers, printers, and/or other computers, among other things. Still further yet, the interface component 1070 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method of facilitating reactive programming, comprising:
    employing at least one processor configured to execute computer-executable instructions stored in memory to perform the following acts:
    receiving a non-reactive expression;
    producing a reactive expression from the non-reactive expression, wherein the reactive expression is a reactive version of the non-reactive expression; and
    generating an optimized version of the reactive expression that reduces computational work based on one or more input sequences specified by the reactive expression and frequency at which the one or more input sequences produce elements.

2. The method of claim 1, generating the optimized version further comprises eliminating multiple subscriptions to a single source.

3. The method of claim 1, generating the optimized version further comprises applying one or more domain-specific optimizations.

4. The method of claim 1, generating the optimized version further comprises generating code that restricts reevaluation of the reactive expression to instances where an input sequence value changes from a previous value.

5. The method of claim 1 further comprises generating the optimized version of the reactive expression dynamically at run time.

6. The method of claim 5 further comprises generating the optimized version of the reactive expression as a function of a predetermined threshold.

7. The method of claim 1, generating the optimized version further comprises assigning shortest path length in in a tree representation of the expression to an input sequence of the one or more input sequences with highest frequency of element production.

8. A system that facilitates reactive programming, comprising:
    a processor coupled to a memory, the processor configured to execute the following computer-executable components stored in the memory:
    a first component configured to automatically generate a reactive expression from a non-reactive expression, wherein the reactive expression is a reactive version of the non-reactive expression; and
    a second component configured to optimize the reactive expression to reduce computational work based on one or more input sequences specified by the reactive expression and a frequency at which the one or more input sequences produce elements.

9. The system of claim 8, the second component is further configured to alter the reactive expression to limit reevaluation of at least parts of the reactive expression.

10. The system of claim 8, the second component is further configured to alter the reactive expression to optimize for a particular domain.

11. The system of claim 8, the second component is further configured to filter out identical contiguous values.

12. The system of claim 8 further comprises a third component external to the first component configured to rewrite the reactive expression based on a domain.

13. A method of facilitating reactive programming, comprising:
    employing at least one processor configured to execute computer-executable instructions stored in memory to perform the following acts automatically:
    receiving a non-reactive expression;
    generating a reactive expression from the non-reactive expression, wherein the
    reactive expression is a reactive version of the non-reactive expression; and
    optimizing the reactive expression to reduce computational work based on one or more input sequences specified by the reactive expression and frequency at which the one or more input sequences produce elements.

14. The method of claim 13, optimizing the reactive expression further comprises eliminating multiple subscriptions to a single source.

15. The method of claim 13, optimizing the reactive expression further comprises restricting re-computation of the reactive expression to instances where an input sequence value changes from a previous value.

16. The method of claim 13, optimizing the reactive expression further comprises re-writing the reactive expression based on domain specific information.

17. A computer-readable storage medium having instructions stored thereon that enable at least one processor to perform a method upon execution of the instructions, the method comprising:
    receiving a non-reactive expression;
    producing a reactive expression automatically from the non-reactive expression, wherein the reactive expression is a reactive version of the non-reactive expression; and
    generating an optimized version of the reactive expression automatically that reduces computational work based on one or more input sequences specified by the reactive expression and frequency at which the one or more input sequences produce elements.

18. The computer-readable storage medium of claim 17, the method further comprises eliminating multiple subscriptions to duplicate input sequences from the reactive expression.

19. The computer-readable storage medium of claim 17, the method further comprises generating the optimized version of the reactive expression automatically based on domain specific information.

20. The computer-readable storage medium of claim 17, generating the optimized version further comprises assigning shortest path length in in a tree representation of the expression to an input sequence of the one or more input sequences with highest frequency of element production.

* * * * *